(12) United States Patent
Mei

(10) Patent No.: US 10,602,337 B2
(45) Date of Patent: Mar. 24, 2020

(54) ROUTE CONFIGURATION METHOD AND APPARATUS FOR CONTACTLESS APPLICATION

(71) Applicant: Huawei Technologies Co., Ltd., Shenzhen (CN)

(72) Inventor: Jingqing Mei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/304,090

(22) PCT Filed: May 25, 2016

(86) PCT No.: PCT/CN2016/083259
§ 371 (c)(1),
(2) Date: Nov. 21, 2018

(87) PCT Pub. No.: WO2017/201682
PCT Pub. Date: Nov. 30, 2017

(65) Prior Publication Data
US 2019/0320305 A1    Oct. 17, 2019

(51) Int. Cl.
*H04W 4/80* (2018.01)
*H04B 5/00* (2006.01)
(Continued)

(52) U.S. Cl.
CPC ............ *H04W 4/80* (2018.02); *H04B 5/0056* (2013.01); *H04L 45/021* (2013.01); *H04W 48/08* (2013.01)

(58) Field of Classification Search
USPC ...................................................... 455/41.1
See application file for complete search history.

(56) References Cited

U.S. PATENT DOCUMENTS 8,744,347 B2 *  6/2014  Charrat ................ G06Q 20/341
                                                           455/41.1
9,020,423 B2 *  4/2015  Naniyat ............... G06K 7/0008
                                                           455/41.1
(Continued)

FOREIGN PATENT DOCUMENTS

CN        103222291 A  * 11/2010  ............ H04W 12/08
CN        103065107 A     4/2013
(Continued)

OTHER PUBLICATIONS

"NFC Controller Interface (NCI) Specification," XP055388030, NFCForum-TS-NCI 1.0, Nov. 6, 2012, 146 pages.
(Continued)

*Primary Examiner* — Edward F Urban
*Assistant Examiner* — Ralph H Justus
(74) *Attorney, Agent, or Firm* — Conley Rose, P.C.

(57) ABSTRACT

A route configuration method and apparatus for a contactless application, where the method includes receiving, by a near field communication (NFC) controller (NFCC), a data frame from a peer device using a first NFC communications technology, and sending, by the NFCC, the data frame to a determined target NFC execution environment (NFCEE) in a target route entry. A plurality of communication channels exist between the NFCEE and the NFCC, and therefore a route entry includes indication information indicating that a first communication channel corresponding to the first NFC communications technology is in an active state such that when determining the target route entry, the NFCC can determine, based on the indication information in the route entry, that the route entry in which the first communication channel corresponding to the first NFC communications technology is in the active state is the target route entry.

20 Claims, 8 Drawing Sheets

(51) Int. Cl.
*H04W 48/08* (2009.01)
*H04L 12/755* (2013.01)

(56) References Cited

U.S. PATENT DOCUMENTS

| | | | |
|---|---|---|---|
| 2012/0178366 | A1 | 7/2012 | Levy et al. |
| 2013/0078920 | A1* | 3/2013 | Hillan .................. H04W 48/16 455/41.1 |
| 2014/0035727 | A1* | 2/2014 | Nguyen ................ H04W 12/08 340/10.1 |
| 2016/0140537 | A1 | 5/2016 | Salcedo et al. |
| 2016/0227012 | A1 | 8/2016 | Chai et al. |
| 2016/0309287 | A1 | 10/2016 | Nguyen |
| 2016/0360352 | A1* | 12/2016 | Khan ..................... H04W 4/80 |
| 2017/0222927 | A1 | 8/2017 | Chang et al. |
| 2017/0303077 | A1 | 10/2017 | Li |
| 2018/0310157 | A1 | 10/2018 | Pan et al. |

FOREIGN PATENT DOCUMENTS

| | | |
|---|---|---|
| CN | 103222291 A | 7/2013 |
| CN | 104463255 A | 3/2015 |
| CN | 105472546 A | 4/2016 |
| WO | 2016049852 A1 | 4/2016 |
| WO | 2016049885 A1 | 4/2016 |

OTHER PUBLICATIONS

Foreign Communication From a Counterpart Application, European Application No. 16902672.1, Extended European Search Report dated Apr. 5, 2019, 10 pages.
Machine Translation and Abstract of Chinese Publication No. CN103065107, Apr. 24, 2013, 27 pages.
"Identification cards—Integrated circuit, cards—Part 4: Organization, security and commands for interchange," International Standard, ISO/IEC 7816-4, Second edition, Jan. 15, 2005, 90 pages.
"Identification cards—Contactless integrated circuit(s) cards—Proximity cards—Part 3: Initialization and anticollision," International Standard, ISO/IEC 14443-3, First edition, Feb. 1, 2001, 58 pages.
Foreign Communication From a Counterpart Application, PCT Application No. PCT/CN2016/083259, English Translation of International Search Report dated Feb. 15, 2017, 3 pages.
Foreign Communication From a Counterpart Application, PCT Application No. PCT/CN2016/083259, English Translation of Written Opinion dated Feb. 15, 2017, 5 pages.

\* cited by examiner

ROUTE CONFIGURATION METHOD AND APPARATUS FOR CONTACTLESS APPLICATION

CROSS-REFERENCE TO RELATED APPLICATIONS

This application is a U.S. National Stage of International Patent Application No. PCT/CN2016/083259 filed on May 25, 2016, which is hereby incorporated by reference in its entirety.

TECHNICAL FIELD

The present invention relates to a near field communication (English: Near Field Communication, NFC) technology, and in particular, to a route configuration method and apparatus for a contactless application.

BACKGROUND

An NFC technology evolves from consolidation of a radio frequency identification (English: Radio Frequency Identification, RFID) technology and an interworking technology. By using the NFC technology, functions such as an induction card reader, card emulation, and point-to-point communication can be consolidated on a single chip, and identification and data exchange between a device and a compatible device can be performed within a short distance.

In a card emulation mode, a card emulation terminal (such as a mobile phone supporting the card emulation mode) is emulated as a whole as a card, to be accessed by a card reader terminal. A structure of the card emulation terminal includes a near field communication controller (English: Near Field Communication Controller, NFCC) and at least one near field communication execution environment (English: Near Field Communication Execution Environment, NFCEE). The NFCC is responsible for data transmission to and from the card reader terminal by using a radio frequency (English: Radio Frequency, RF) interface, and the NFCEE is a specific entity configured to provide an execution environment to a contactless application.

When the NFCC is connected to one NFCEE, a communications technology that is the same as an NFC communications technology type supported by the NFCEE is configured for the NFCC. When the card reader terminal selects any one of communication types supported by the NFCC for communication, the selected communication type matches a type of a communication channel between the NFCC and the NFCEE. For example, as shown in FIG. 1, the NFC communications technology type supported by the NFCEE is Type A, and then the NFC communications technology type supported by and configured for the NFCC is also Type A. In this case, the type, namely, PIPE A, of the communication channel between the NFCC and the NFCEE matches Type A, and the card reader terminal selects Type A for data frame transmission to and from the NFCC. The communication channel between the NFCC and the NFCEE matches Type A selected by the card reader terminal, and therefore communication is normal.

When the NFCC is connected to two NFCEEs, a communications technology that is the same as an NFC communications technology type supported by both of the two NFCEEs is configured for the NFCC. When the card reader terminal selects any one of communication types supported by the NFCC for communication, the selected communication type may not match a type of a communication channel between the NFCC and an NFCEE, consequently causing a communication failure. For example, as shown in FIG. 2, an NFCEE 01 supports Type A and an NFCEE 02 supports Type A and Type B, and then NFC communications technology types supported by and configured for the NFCC are Type A and Type B. In addition, in this case, a communication channel between the NFCC and the NFCEE 01 is PIPE A matching Type A, and communication channels between the NFCC and the NFCEE 02 are PIPE A matching Type A and PIPE B matching Type B. When the card reader terminal selects Type B for data frame transmission to and from the NFCC, if the NFCC selects the NFCEE 01, a communication failure is caused because the communication channel between the NFCC and the NFCEE 01 does not match Type B selected by the card reader terminal.

SUMMARY

Embodiments of the present invention provide a route configuration method and apparatus for a contactless application, to ensure route configuration matchability in a multi-NFCEE scenario.

A first aspect of the present invention provides a route configuration method for a contactless application, applied to a near field communication NFC terminal, and including:
receiving, by an NFCC, a data frame from a peer device by using a first NFC communications technology; then, determining, by the NFCC, a target route entry in a plurality of route entries in a route table, where the target route entry indicates an HCI-NFCEE, and a route entry in which a communication channel that is between the HCI-NFCEE and the NFCC and that corresponds to the first NFC communications technology is in an active state is the target route entry; and finally, sending, by the NFCC, the data frame, to the HCI-NFCEE in the target route entry.

In this embodiment, a plurality of communication channels exist between an NFCEE and the NFCC, and therefore a route entry includes indicating whether a first communication channel of the first NFC communications technology is in the active state, so that when determining the target route entry, the NFCC can determine that in route entries, a route entry in which the first communication channel corresponding to the first NFC communications technology is in the active state is the target route entry. In this way, matchability between an NFC communications technology type for data frame transmission between terminal devices and an NFC communications technology type for data frame transmission by the NFCC to the NFCEE is ensured, and route configuration matchability in a multi-NFCEE scenario is improved.

In some embodiments of the present invention, the determining, by the NFCC, a target route entry in a plurality of route entries in a route table includes: first, determining, by the NFCC, that a route entry that is in the plurality of route entries in the route table and whose NFCEE ID belongs to a first preset interval is a first candidate route entry, where an NFCEE ID corresponding to the HCI-NFCEE belongs to the first preset interval; and then, determining, by the NFCC, that in the first candidate route entry, a route entry in which a communication channel that is between the HCI-NFCEE and the NFCC and that corresponds to the first NFC communications technology is in the active state is the target route entry.

In this embodiment, when determining the target route entry, the NFCC first determines, successively for each route entry and based on an NFCEE ID, whether an NFCEE in the route entry is an HCI-NFCEE, if yes, then determines that, in the route entry, a communication channel that is between the HCI-NFCEE and the NFCC and that corresponds to the first NFC communications technology is in the active state, and if yes, determines that the route entry is the target route entry. In this way, matchability between an NFC communications technology type for data frame transmission between terminal devices and an NFC communications technology type for data frame transmission by the NFCC to the NFCEE is ensured, and route configuration matchability in a multi-NFCEE scenario is improved.

In some embodiments of the present invention, the target route entry is an AID route entry, and the determining, by the NFCC, that in the first candidate route entry, a route entry in which a communication channel that is between the HCI-NFCEE and the NFCC and that corresponds to the first NFC communications technology is in the active state is the target route entry includes: determining, by the NFCC, an AID value in a data frame; determining, by the NFCC, that in the first candidate route entry, the route entry in which the communication channel that is between the HCI-NFCEE and the NFCC and that corresponds to the first NFC communications technology is in the active state is a second candidate route entry; and determining, by the NFCC, that a route entry in which an AID value in the second candidate route entry and the AID value in the data frame satisfy a matching relationship is the target route entry. The matching relationship is: an AID value in the target route entry is the same as the AID value in the data frame; an AID value in the target route entry is a part of the AID value in the data frame; or the AID value in the data frame is a part of an AID value in the target route entry.

In this embodiment, a specific determining manner when a route entry is an AID route entry is provided. Based on the determining in the foregoing embodiments, in this case, whether an AID value in the route entry and an AID value in a data frame satisfy a matching relationship further needs to be determined. If the matching relationship is satisfied, it is determined that the route entry is the target route entry. In this way, matchability between an NFC communications technology type for data frame transmission between terminal devices and an NFC communications technology type for data frame transmission by the NFCC to the NFCEE is ensured, and route configuration matchability in a multi-NFCEE scenario is improved.

In some embodiments of the present invention, the target route entry is a protocol route entry, and the determining, by the NFCC, that in the first candidate route entry, a route entry in which a communication channel that is between the HCI-NFCEE and the NFCC and that corresponds to the first NFC communications technology is in the active state is the target route entry includes: determining, by the NFCC, that in the first candidate route entry, the route entry in which the communication channel that is between the HCI-NFCEE and the NFCC and that corresponds to the first NFC communications technology is in the active state is a second candidate route entry; and determining, by the NFCC, that in the second candidate route entry, a route entry in which an NFC protocol type is a first NFC protocol type is the target route entry. The first protocol type is a protocol type activated by the NFCC.

In this embodiment, a specific determining manner when a route entry is a protocol route entry is provided. Based on the determining in the foregoing embodiments, in this case, whether an NFC protocol type in the route entry is a first protocol type corresponding to the first communications technology further needs to be determined, and if yes, it is determined that the route entry is the target route entry. In this way, matchability between an NFC communications technology type for data frame transmission between terminal devices and an NFC communications technology type for data frame transmission by the NFCC to the NFCEE is ensured, and route configuration matchability in a multi-NFCEE scenario is improved.

In some embodiments of the present invention, the NFC terminal in which the NFCC is located further includes a main processor, and before the determining, by the NFCC, a target route entry in a plurality of route entries in a route table, the method further includes:

receiving, by the NFCC, an NFCEE reporting command sent by the main processor;

sending, by the NFCC based on the NFCEE reporting command, an NFCEE discovery notification message corresponding to each NFCEE to the main processor, where if the NFCEE is an HCI-NFCEE, the NFCEE discovery notification message includes an active state of a communication channel when the HCI-NFCEE communicates with the NFCC by using different communications technologies, so that the main processor configures a route entry between each of the NFCEEs and the NFCC, to obtain the route table;

receiving, by the NFCC, the route table sent by the main processor; and storing, by the NFCC, the route table.

In this embodiment, based on a configuration method in a route table stored in the NFCC, each route entry in the route table stored in the NFCC not only includes an HCI-NFCEE ID used for indicating whether an NFCEE to which the route entry points is an HCI-NFCEE, but also includes an active state of a communication channel when the NFCEE to which the route entry points is an HCI-NFCEE and the HCI-NFCEE communicates with the NFCC by using different communications technologies, so that when the target route entry is determined, a route entry that points to the HCI-NFCEE and in which the first communication channel corresponding to the first NFC communications technology is in the active state is selected as the target route entry. In this way, matchability between an NFC communications technology type for data frame transmission between terminal devices and an NFC communications technology type for data frame transmission by the NFCC to the NFCEE is ensured, and route configuration matchability in a multi-NFCEE scenario is improved.

In some embodiments of the present invention, the method further includes: detecting, by the NFCC, that an active state of a communication channel between the NFCC and at least one of the NFCEEs changes, and then sending, by the NFCC, a communication channel status update message to the main processor, so that the main processor reconfigures the route table based on the communication channel status update message.

In this embodiment, the route table stored in the NFCC can be updated in real time, so that the target route entry can be more accurately determined.

A second aspect of the present invention provides a route configuration method for a contactless application, applied to a near field communication NFC terminal, and including: sending, by a main processor, an NFCEE reporting command to an NFCC in a terminal device in which the main processor is located (after the terminal device in which the main processor is located is initialized, sending, by the main processor, an NFCEE reporting command to the NFCC, and after receiving the reporting command, sending, by the NFCC, an NFCEE discovery notification message to the main processor based on RF parameters of NFCEEs connected to the NFCC); receiving, by the main processor, the NFCEE discovery notification message sent by the NFCC, where if the NFCEE is an HCI-NFCEE, the NFCEE discovery notification message includes an active state of a communication channel when the HCI-NFCEE communicates with the NFCC by using different NFC communications technologies; configuring, by the main processor, route entries between the NFCEE and the NFCC based on the NFCEE discovery notification message, where the route entries form a route table; and sending, by the main processor, the route table to the NFCC.

In this embodiment, each route entry in the route table configured by the main processor not only includes an HCI-NFCEE ID used for indicating whether an NFCEE to which the route entry points is an HCI-NFCEE, but also includes an active state of a communication channel when the NFCEE to which the route entry points is an HCI-NFCEE and the HCI-NFCEE communicates with the NFCC by using different communications technologies, so that when the NFCC determines the target route entry based on the route table, a route entry that points to the HCI-NFCEE and in which a first communication channel corresponding to a first NFC communications technology is in the active state is selected as the target route entry. In this way, matchability between an NFC communications technology type for data frame transmission between terminal devices and an NFC communications technology type for data frame transmission by the NFCC to the NFCEE is ensured, and route configuration matchability in a multi-NFCEE scenario is improved.

In some embodiments of the second aspect, the main processor receives a communication status change message sent by the NFCC after detecting that a communications technology type between the NFCC and at least one NFCEE changes; reconfigures the route table based on the communication status change message; and then sends the reconfigured route table to the NFCC.

In some embodiments of the second aspect, communication status change information includes: an identifier ID of an NFCEE having a changed communications technology type between the NFCEE and the NFCC, and an invalid communications technology type between an NFCEE and the NFCC; and in this case, that the main processor reconfigures the route table based on the communication status change message includes:

determining, by the main processor based on the ID of the NFCEE having the changed communications technology type between the NFCEE and the NFCC, whether the NFCEE having the changed communications technology type is a host control interface HCI-NFCEE;

if yes, determining, by the main processor, whether the invalid communications technology type between the HCI-NFCEE and the NFCC is all communications technology types limited by an HCI; and if yes, deleting, by the main processor, all AID route entries in the route table that are consistent with an ID value of the HCI-NFCEE.

In some embodiments of the second aspect, if the main processor determines that the invalid communications technology type between the HCI-NFCEE and the NFCC is some communications technology types limited by the HCI, the main processor deletes an invalid communications technology type in the AID route entries in the route table that are consistent with the ID value of the HCI-NFCEE.

In this embodiment, the main processor can update the route table stored in the NFCC in real time, so that the NFCC can more accurately determine the target route entry.

A third aspect of the present invention provides a route configuration apparatus for a contactless application, applied to a near field communication NFC terminal, where the NFC terminal includes a near field communication controller NFCC and a plurality of near field communication execution environments NFCEEs, the NFC terminal further includes a route table, the route table includes at least one route entry, and the configuration apparatus is disposed in the near field communication controller NFCC, where the apparatus includes:

a receiving module, configured to receive a data frame from a peer device by using a first NFC communications technology;

a determining module, configured to determine a target NFCEE in a target route entry, where a plurality of communication channels exist between the target NFCEE and the NFCC, where the plurality of communication channels include a first communication channel corresponding to the first NFC communications technology, the target route entry is a route entry in the at least one route entry, the target route entry includes indication information, and the indication information indicates that the first communication channel is in an active state; and a sending module, configured to send the data frame to the target NFCEE.

In some embodiments of the third aspect, the data frame includes a first AID value, the target route entry includes a second AID value, and the second AID value matches the first AID value.

In some embodiments of the third aspect, that the second AID value matches the first AID value includes one of the following:

the second AID value is the same as the first AID value;
the second AID value is a part of the first AID value; and
the first AID value is a part of the second AID value.

In some embodiments of the third aspect, an NFC protocol type in the target route entry is the same as an NFC protocol type activated by the NFCC.

In some embodiments of the third aspect, the NFC terminal in which the NFCC is located further includes a main processor, and the apparatus further includes a storage module, and before the determining module determines the target route entry in the at least one route entry in the route table, the receiving module is configured to receive an NFCEE reporting command sent by the main processor;

the sending module is configured to send, based on the NFCEE reporting command, an NFCEE discovery notification message corresponding to each NFCEE to the main processor, where if the NFCEE is an HCI-NFCEE, the NFCEE discovery notification message includes an active state of a communication channel when the HCI-NFCEE communicates with the NFCC by using different NFC communications technologies, so that the main processor configures a route entry between each of the NFCEEs and the NFCC, to obtain the route table;

the receiving module is further configured to receive the route table sent by the main processor; and the storage module stores the route table.

In some embodiments of the third aspect, the determining module is further configured to: when it is detected that an active state of a communication channel between the NFCC and at least one of the NFCEEs changes, send, by the determining module, control information to the sending module, where the control information is used for controlling the sending module to send a communication channel status update message to the main processor, so that the main processor reconfigures the route table based on the communication channel status update message; and the sending module sends the communication channel status update message to the main processor.

A fourth aspect of the present invention provides a route configuration apparatus for a contactless application, applied to a near field communication NFC terminal, where the NFC terminal includes a near field communication controller NFCC and a plurality of near field communication execution environments NFCEEs, the NFC terminal further includes a route table, the route table includes at least one route entry, and the configuration apparatus is disposed in the near field communication controller NFCC, where the apparatus includes:

a receiver, configured to receive a data frame from a peer device by using a first NFC communications technology;

a processor, configured to determine a target NFCEE in a target route entry, where a plurality of communication channels exist between the target NFCEE and the NFCC, where the plurality of communication channels include a first communication channel corresponding to the first NFC communications technology, the target route entry is a route entry in the at least one route entry, the target route entry includes indication information, and the indication information indicates that the first communication channel is in an active state; and a transmitter, configured to send the data frame to the target NFCEE.

In some embodiments of the fourth aspect, the data frame includes a first AID value, the target route entry includes a second AID value, and the second AID value matches the first AID value.

In some embodiments of the fourth aspect, that the second AID value matches the first AID value includes one of the following:

the second AID value is the same as the first AID value;
the second AID value is a part of the first AID value; and
the first AID value is a part of the second AID value.

In some embodiments of the fourth aspect, an NFC protocol type in the target route entry is the same as an NFC protocol type activated by the NFCC.

In some embodiments of the fourth aspect, the NFC terminal in which the NFCC is located further includes a main processor, and the apparatus further includes a memory, and before the processor determines the target route entry in the at least one route entry in the route table, the receiver is configured to receive an NFCEE reporting command sent by the main processor;

the transmitter is configured to send, based on the NFCEE reporting command, an NFCEE discovery notification message corresponding to each NFCEE to the main processor, where if the NFCEE is an HCI-NFCEE, the NFCEE discovery notification message includes an active state of a communication channel when the HCI-NFCEE communicates with the NFCC by using different NFC communications technologies, so that the main processor configures a route entry between each of the NFCEEs and the NFCC, to obtain the route table;

the receiver is further configured to receive the route table sent by the main processor; and the memory stores the route table.

In some embodiments of the fourth aspect, the processor module is further configured to: when it is detected that an active state of a communication channel between the NFCC and at least one of the NFCEEs changes, send control information to the transmitter, where the control information is used for controlling the transmitter to send a communication channel status update message to the main processor, so that the main processor reconfigures the route table based on the communication channel status update message; and the transmitter sends the communication channel status update message to the main processor.

In the embodiments of the present invention, the NFCC receives the data frame from the peer device by using the first NFC communications technology; and the NFCC sends the data frame to the determined target NFCEE in the target route entry. The plurality of communication channels exist between the NFCEE and the NFCC, and therefore a route entry includes indication information indicating that the first communication channel corresponding to the first NFC communications technology is in the active state, so that when determining the target route entry, the NFCC can determine, based on the indication information in the route entry, that the route entry in which the first communication channel corresponding to the first NFC communications technology is in the active state is the target route entry. In this way, the matchability between the NFC communications technology type for the data frame transmission between the terminal devices and the NFC communications technology type for the data frame transmission by the NFCC to the NFCEE is ensured, and the route configuration matchability in the multi-NFCEE scenario is improved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may derive other drawings from these accompanying drawings without creative efforts.

DESCRIPTION OF EMBODIMENTS

Figure 1:
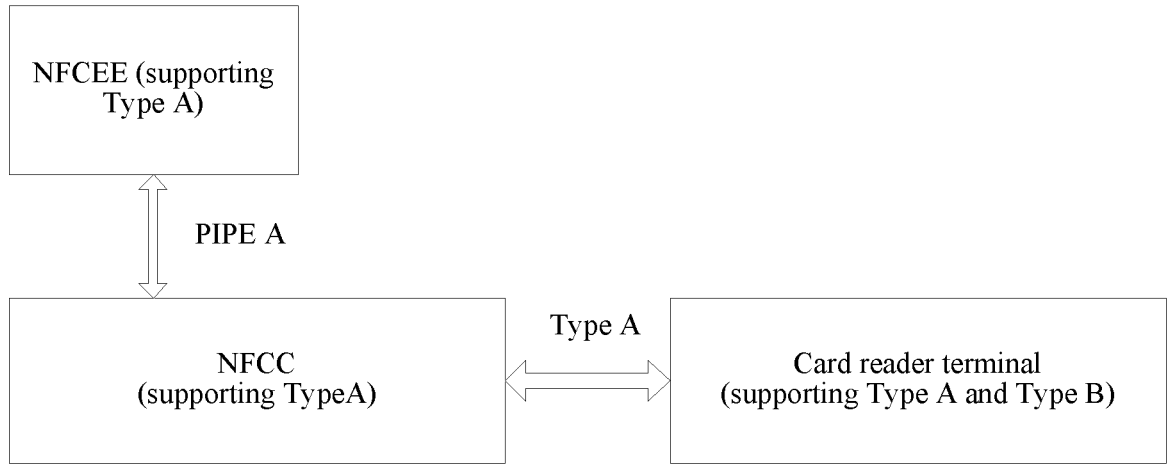
FIG. 1 is a schematic diagram 1 of a contactless service in a single-NFCEE scenario.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In an NFC communication mode, a terminal device having an NFC function usually includes a main processor, an NFCC, and at least two NFCEEs, and the at least two NFCEEs are connected to the NFCC.

The main processor may be a device host (English: Device Host, DH), a managing entity (English: Managing Entity, ME), or a central processing unit (English: Central Processing Unit, CPU) in the terminal having the NFC function. The main processor is configured to be responsible for managing the entire terminal, including NFCC management, such as initialization, configuration, or power supply management.

The DH is a term used in the NCI standard formulated by the NFC Forum (NFC Forum), and may correspond to a terminal host (English: Terminal Host) in the Host Controller Interface (English: Host Controller Interface, HCI) standard formulated by the European Telecommunications Standards Institute (English: European Telecommunication Standards Institute, ETSI). In addition, if an ME in a standard formulated by the Global Platform international standard organization (English: Global Platform, GP) is implemented on the terminal host, the DH may also be referred to as a managing host (English: Managing Host, MH).

The NFCC is responsible for performing physical transmission of data by using a radio frequency RF interface and an antenna, to implement communication with a peer device. In an NFC device having a function, the NFCC usually corresponds to an NFC chip.

The NFCC is a term used in the NCI standard formulated by the NFC Forum (NFC Forum), and the NFCC may correspond to a contactless front-end (English: Contactless Front-end, CLF) in the HCI standard formulated by the ETSI. In this case, a host controller (English: Host Controller) in an HCI needs to be implemented on the NFCC.

The NFCEE is a specific entity that provides an NFC application with a secure execution environment. The NFCEE is a term used in the NCI standard formulated by the NFC Forum (NFC Forum), and the NFCEE may correspond to a host (Host) in the HCI standard formulated by the ETSI, for example, a universal Integrated circuit card (English: Universal Integrated Circuit Card, UICC), an embedded secure element (English: Embedded Secure Element, eSE), or a secure digital memory card (English: Secure Digital Memory Card, SD); and may further correspond to a secure element (English: Secure Element, SE) or a card emulation environment (English: Card Emulation Environment, CEE) in a standard formulated by the Global Platform international standard organization (English: Global Platform, GP).

Figure 3:
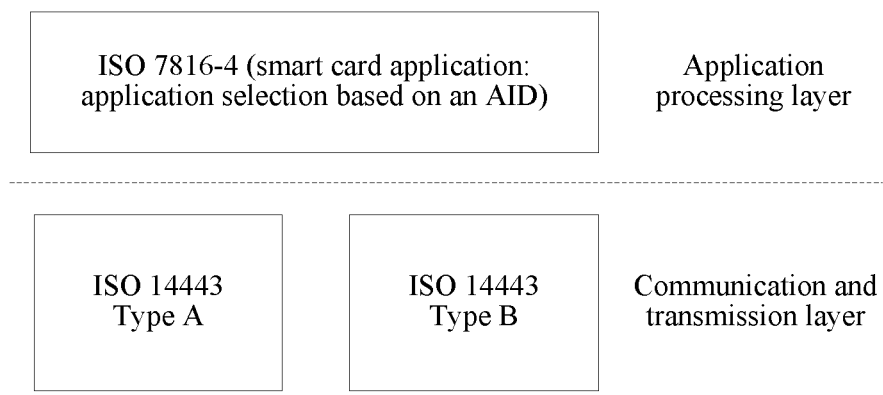
FIG. 3 is a schematic diagram of underlying data transmission by a terminal having an NFC function.

FIG. 3 is a schematic diagram of underlying data transmission by a terminal having an NFC function. As shown in FIG. 3, a very important type of contactless application is a smart card application that is based on the ISO 7816, that is, an AID (Application Identifier, application identifier) application. This type of application may be based on an NFC communications technology type: Type A or Type B.

For an NFC communications technology type, namely, Type X (X=A or B) supported by both the NFCEE and the NFCC, a communication channel PIPE X that matches the NFC communications technology type supported by both the NFCEE and the NFCC may be established between the NFCEE and the NFCC to perform communication. If the NFCEE does not support Type A, available PIPE A cannot be established between the NFCEE and the NFCC. Alternatively, if the NFCEE does not support Type B, available PIPE B cannot be established between the NFCEE and the NFCC.

Figure 4:
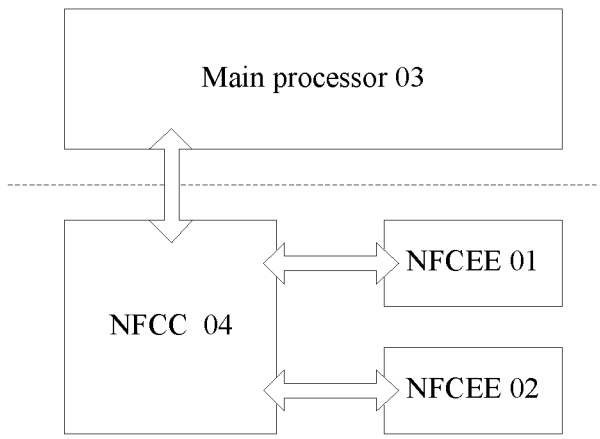
FIG. 4 is a schematic structural diagram of a terminal having an NFC function.

FIG. 4 is a schematic structural diagram of a terminal having an NFC function. It can be learned from FIG. 4 that, the terminal having the NFC function includes a main processor 03, an NFCC 04, and an NFCEE. An implementation form of the main processor may be a DH, a CPU, or an ME. A quantity of NFCEEs connected to the NFCC 04 may be set based on an actual application scenario. In FIG. 3, the NFCC 04 is connected to two NFCEEs: an NFCEE 01 and an NFCEE 02.

Figure 2:
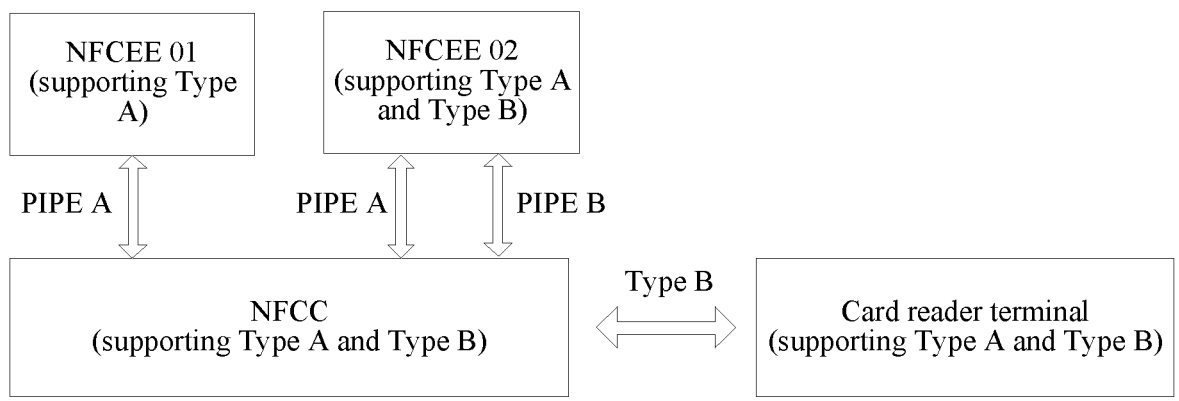
FIG. 2 is a schematic diagram 1 of a contactless service in a multi-NFCEE scenario.

Based on the terminal that has the NFC function and that is shown in FIG. 4, and with reference to FIG. 1 to FIG. 3, a basic procedure in which the terminal having the NFC function may serve as a card emulation terminal to perform contactless service communication with a card reader terminal includes:

(1) During initialization, the main processor 03 obtains RF parameters of a plurality of NFCEEs, determines, through combination and calculation, an RF parameter that needs to be sent to the NFCC, and then configures the RF parameter for an NFCC in the card emulation terminal.

(2) The card reader terminal may learn, by using procedures such as technical detection and conflict detection, NFC communications technology types that are supported by a card emulation terminal side, and then select one NFC communications technology type from the NFC communications technology types, to transmit a data frame to the card emulation terminal.

(3) An NFCEE in the card emulation terminal receives the data frame sent by an NFCC in the card reader terminal.

Figure 5:
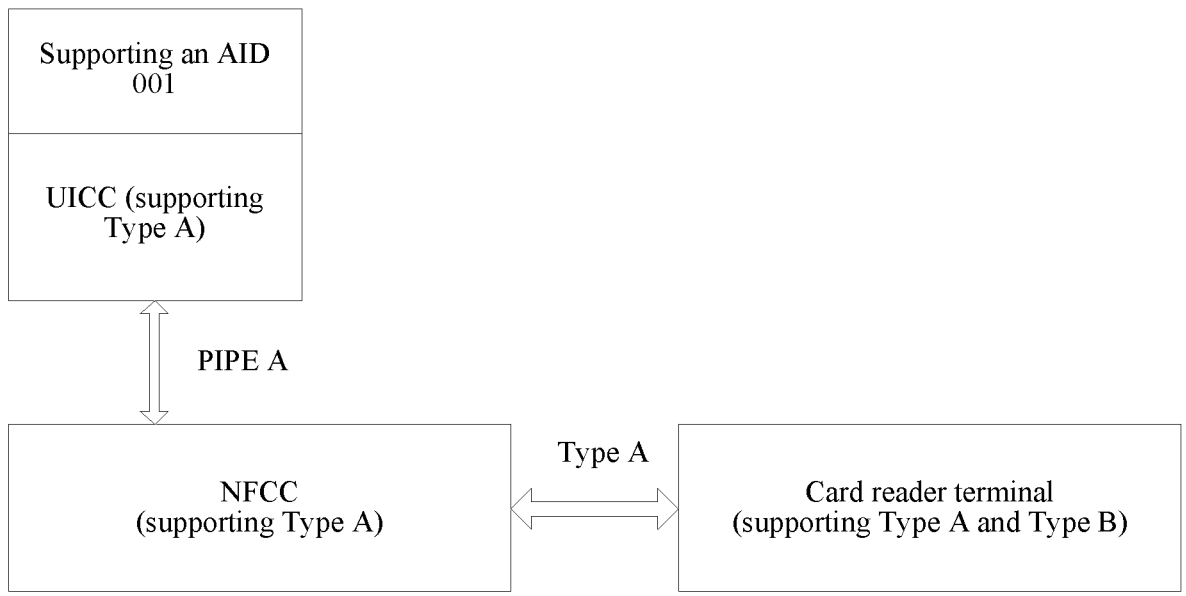
FIG. 5 is a schematic diagram 2 of a contactless service in a single-NFCEE scenario.

FIG. 5 is a communication flowchart 2 of a contactless service in a single-NFCEE scenario. In FIG. 5, a card emulation terminal includes an NFCC and an NFCEE. NFC communications technology types supported in a card reader terminal are Type A and Type B. The NFCEE uses a UICC as a physical implementation entity. An AID 001 application is supported in the UICC. An NFC communications technology type supported by the UICC is Type A. After initialization, an NFC communications technology type supported by the NFCC in the card emulation terminal is also Type A. Because the NFCC and the UICC support the same NFC communications technology type, PIPE A corresponding to Type A is established between the UICC and the NFCC, to transmit data.

In FIG. 5, when data transmission for a contactless application is performed, the card reader terminal learns, by using procedures such as technical detection and conflict detection, that an NFC communications technology type supported by the card emulation terminal is Type A. Therefore, the card reader terminal sends a data frame to the card emulation terminal by using a Type A communications technology; and after the card emulation terminal receives the data frame sent by the card reader terminal, the NFCC transmits the data frame to the UICC by using PIPE A.

In the single-NFCEE communication scenario, an RF parameter of the NFCC is usually the same as an RF parameter of the NFCEE. Therefore, an NFC communications technology type, for data frame transmission, selected by the card reader terminal based on the NFC communications technology type supported by the NFCC matches a PIPE type establish between the NFCC and the NFCEE.

Figure 6:
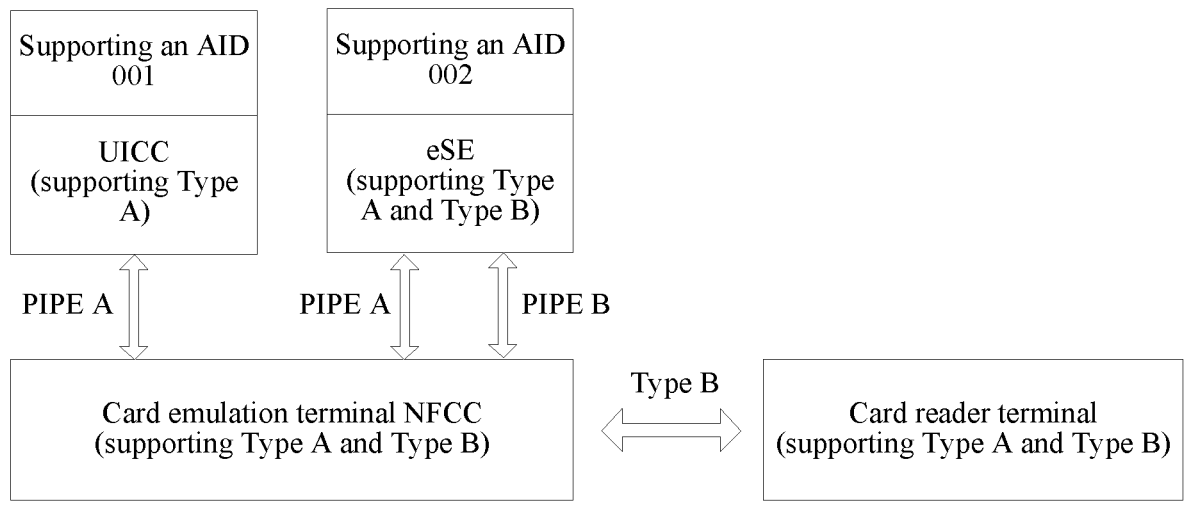
FIG. 6 is a schematic diagram 2 of a contactless service in a multi-NFCEE scenario.

FIG. 6 is a communication flowchart 2 of a contactless service in a multi-NFCEE scenario. As shown in FIG. 6, a card emulation terminal includes an NFCC and NFCEEs. FIG. 6 shows two NFCEEs. One NFCEE uses a UICC as a physical implementation entity, and the other NFCEE uses an eSE as a physical implementation entity. An AID 001 application is supported in the UICC. An NFC communications technology type supported by the UICC is Type A. An AID 002 application is supported in the eSE. NFC communications technology types supported by the eSE are Type A and Type B. NFC communications technology types supported by the NFCC in the card emulation terminal are Type A and Type B. PIPE A is established between the NFCC and the UICC, and PIPE A and PIPE B are established between the NFCC and the eSE.

As shown in FIG. 6, in the multi-NFCEE communication scenario, route table configuration and management may be performed by using an ME (not shown). After the NFCC is initialized, the NFCC reports information about each connected NFCEE to the ME. The ME obtains a list of application AIDs supported by each NFCEE, and information about an NFC communications technology type supported by each NFCEE, stores the list and the information, and uses the list and the information to construct a route table to be configured into the NFCC.

In the multi-NFCEE communication scenario, an RF parameter of the NFCC is obtained by combining RF parameters of a plurality of NFCEEs, that is, in this case, the RF parameter of the NFCC includes the RF parameters of all the NFCEEs. Therefore, an NFC communications technology type configured by the NFCC based on the RF parameter may be different from a communication channel type that is currently active between an NFCEE and the NFCC. For example, the NFC communications technology types supported by the NFCC in the card emulation terminal are Type A and Type B, and only PIPE A is currently active between the UICC and the NFCC.

In FIG. 6, a card reader terminal sends a data frame to the card emulation terminal by using an NFC communications technology type of a Type B type. After the card emulation terminal receives the data frame, a route entry allocated to the data frame may be a route entry pointing to the UICC. An active communication channel between the UICC and the NFCC does not match an NFC communications technology type used by the card reader to send a data frame. In this case, a failure of communication between the card emulation terminal and the card reader terminal is caused.

To resolve the foregoing problem, an embodiment of the present invention provides a route configuration method for a contactless application. Based on this method, information about an active state of a communication channel matching an NFC communications technology type is added to each route entry of the route table, so that when a route entry matching a data frame is determined, a route entry in which a communication channel matching a communications technology type used by the card reader terminal to transmit the data frame is in the active state may be determined, in route entries, as a target route entry, thereby improving accuracy of the communication between the card emulation terminal and the card reader terminal.

Figure 7:
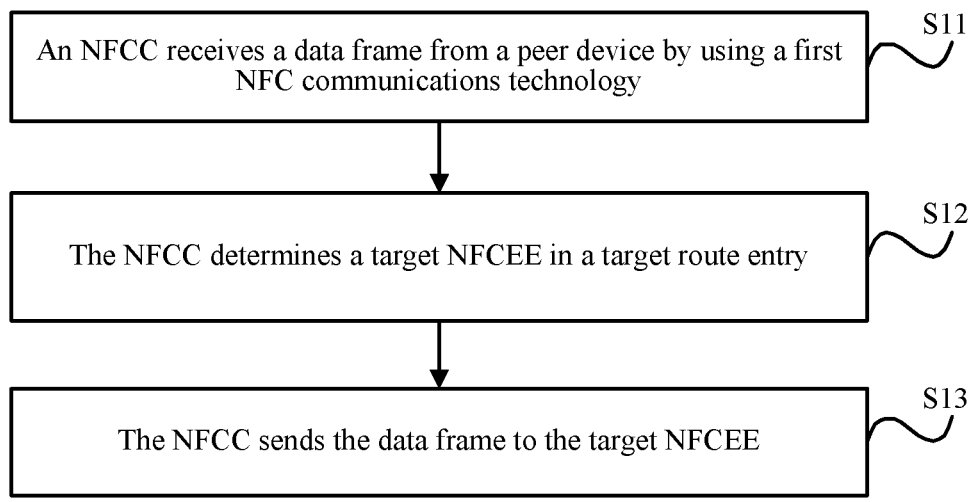
FIG. 7 is a flowchart of a route configuration method for a contactless application according to Embodiment 1 of the present invention.

FIG. 7 is a flowchart of a route configuration method for a contactless application according to Embodiment 1 of the present invention. The method in this embodiment is applied to a near field communication NFC terminal, and the NFC terminal includes a near field communication controller NFCC and a plurality of near field communication execution environments NFCEEs. The NFC terminal further includes a route table. The route table includes a plurality of route entries. The method includes the following steps.

Step S11: An NFCC receives a data frame from a peer device by using a first NFC communications technology.

In NFC communication, the peer device is a terminal device that sends a data frame to a terminal device in which the NFCC is located. For example, the peer device may be a card reader.

Step S12: The NFCC determines a target NFCEE in a target route entry, where a plurality of communication channels exist between the target NFCEE and the NFCC, where the plurality of communication channels include a first communication channel corresponding to the first NFC communications technology, the target route entry is a route entry in at least one route entry, the target route entry includes indication information, and the indication information indicates that the first communication channel is in an active state.

Step S13: The NFCC sends the data frame to the target NFCEE.

In this embodiment of the present invention, the NFCC receives the data frame from the peer device by using the first NFC communications technology; and the NFCC sends the data frame to the determined target NFCEE in the target route entry. The plurality of communication channels exist between the NFCEE and the NFCC, and therefore a route entry includes indication information indicating that the first communication channel corresponding to the first NFC communications technology is in the active state, so that when determining the target route entry, the NFCC can determine, based on the indication information in the route entry, that the route entry in which the first communication channel corresponding to the first NFC communications technology is in the active state is the target route entry. In this way, matchability between an NFC communications technology type for data frame transmission between terminal devices and an NFC communications technology type for data frame transmission by the NFCC to the NFCEE is ensured, and route configuration matchability in a multi-NFCEE scenario is improved.

Two preset fields may be newly added to each route entry in the route table in the NFC terminal. A first preset field stores an NFCEE ID, and a second preset field in the route entry is used for indicating an active state of a communication channel when communication is performed, by using different NFC communications technology types, between the NFCC and an NFCEE that corresponds to the NFCEE ID.

Further, the route entry in the route table may be an AID route entry, or may be a protocol route entry.

When the route entry included in the route table in the NFC terminal is an AID route entry, the AID route entry includes a first preset field, a second preset field, and a preset AID value.

When the route entry included in the route table in the NFC terminal is a protocol route entry, the protocol route entry includes a first preset field, a second preset field, and a preset NFC protocol type.

Before S12 is performed, the NFCC further needs to obtain the route table that includes the plurality of route entries.

Figure 8:
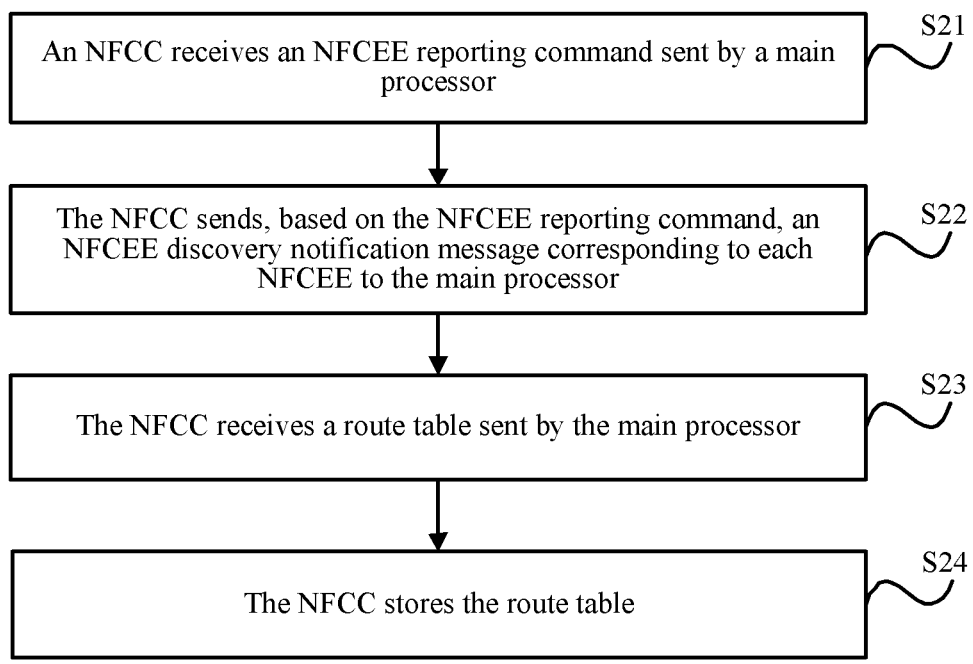
FIG. 8 is a flowchart of obtaining, by an NFCC, a route table including a plurality of route entries according to an embodiment of the present invention.

FIG. 8 is a flowchart of obtaining, by an NFCC, a route table including a plurality of route entries according to an embodiment of the present invention. As shown in FIG. 8, the method in this embodiment includes the following steps.

Step S21: The NFCC receives an NFCEE reporting command sent by a main processor.

Step S22: The NFCC sends, based on the NFCEE reporting command, an NFCEE discovery notification message corresponding to each NFCEE to the main processor, where if the NFCEE is an HCI-NFCEE, the NFCEE discovery notification message includes an active state of a communication channel when the HCI-NFCEE communicates with the NFCC by using different NFC communications technology types, so that the main processor configures a route entry between each NFCEE and the NFCC, to obtain a route table.

Step S23: The NFCC receives the route table sent by the main processor.

Step S24: The NFCC stores the route table.

Specifically, that the NFCC sends, based on the NFCEE reporting command, an NFCEE discovery notification message to the main processor includes: determining, by the NFCC based on an identifier (English: identification, ID) of each NFCEE, whether each NFCEE is an HCI-NFCEE.

If an NFCEE is an HCI-NFCEE, the NFCEE discovery notification message further includes the active state of the communication channel when the HCI-NFCEE communicates with the NFCC by using different NFC communications technology types, for example, whether Type A and/or Type B is available.

After receiving the discovery notification message of each NFCEE that is sent by the NFCC, the main processor forms a route entry between each NFCEE and the NFCC based on an NFC communications technology type that is between each NFCEE and the NFCC and that is included in the discovery notification message of each NFCEE, and an active state of a communication channel when each NFCEE communicates with the NFCC by using different NFC communications technology types, forms a route table, and sends the route table to the NFCC.

In an implementable manner, after the NFCC receives the route table sent by the main processor, the NFCC verifies whether the received route table is valid, and if the received route table is valid, performs step 24.

That the NFCC performs verification on the route table sent by the main processor includes:

determining, by the NFCC based on an NFC communications technology type between an NFCEE to which each route entry in the received route table points and the NFCC, and a type of an NFCEE in each route entry, whether each AID route entry in the route table is a valid route.

A specific determining method includes: for each route entry, determining, by the NFCC based on an NFCEE ID in a first preset field in each route entry, whether the NFCEE to which the route entry points is an HCI-NFCEE; and if the NFCEE to which the route entry points is an HCI-NFCEE, determining, by the NFCC, whether an NFC communications technology type of the route entry corresponding to the HCI-NFCEE includes a preset first NFC communications technology and/or second NFC communications technology, where if the NFC communications technology type includes the preset first NFC communications technology and/or second NFC communications technology, the route entry corresponding to the HCI-NFCEE is valid; otherwise, the route entry corresponding to the HCI-NFCEE is invalid.

For example, an NFC communications technology type limited by an HCI-NFCEE is Type A and/or Type B, and if an NFC communications technology type indicated by an NFC communications technology type in a route entry corresponding to the HCI-NFCEE includes Type A and/or Type B, it is determined that the route entry corresponding to the HCI-NFCEE is valid; otherwise, the route entry corresponding to the HCI-NFCEE is invalid.

When the route entry included in the route table is an AID route entry, a specific implementation of S12 in this case is:

determining, by the NFCC, a first AID value included in load information of a data frame, and determining, by the NFCC, a target route entry based on an NFCEE ID stored in a first preset field in the AID route entry, an active state of a communication channel of a second preset field in the AID route entry, and a preset AID value of the AID route entry, where the determined target route entry satisfies the following conditions:

A: An NFCEE ID in the target route entry belongs to an HCI-NFCEE, and the second preset field in the target route entry indicates that a communication channel for communication between the HCI-NFCEE and the NFCC by using the first NFC communications technology is in an active state.

B: A preset AID value in the target route entry and a first AID value satisfy a matching relationship, and the matching relationship is one of the following relationships:

(1) The preset AID value in the target route entry and the first AID value are the same.

The preset AID value in the target route entry and the first AID value are completely consistent. Usually, there is one target route entry whose preset AID value is completely consistent with a first AID value.

(2) The preset AID value in the target route entry is a part of the first AID value.

For example, if the first AID value is 001110, when the preset AID value in the target route entry is 001, the first AID value matches the preset AID value in the target route entry. In this matching manner, there may be a plurality of route entries whose preset AID values match the first AID value.

(3) The first AID value is a part of the preset AID value in the target route entry.

The first AID value is a part of the preset AID value in the target route entry. For example, if the preset AID value in the target route entry is 001110, when the first AID value is 001, the first AID value matches the preset AID value in the target route entry. In this matching manner, there may be a plurality of route entries whose preset AID values match the first AID value.

The AID route entry may further include a preset power state. The preset power state includes a plurality of power states, to indicate whether the AID route entry is valid when the NFCC is in each power state. The power states include at least one of a power-exhausted state, a power-unexhausted and shutdown state, a screen-on and unlocked state, a screen-on and lock screen state, a screen-off and unlocked state, and a screen-off and lock screen state.

When the AID route entry includes the preset power state, in the preset power state of the determined target route entry, a value of a current power state of the NFCC is a first preset value when a data frame is received. The current power state is one of the plurality of power states included in the preset power state.

When the foregoing process is performed, the NFCC may successively perform the foregoing determining process for each route entry in the route table; and if a route entry satisfying the foregoing conditions is found, the NFCC stops the foregoing determining process, and determines that the found route entry is the target route entry.

When the route entry included in the route table is a protocol route entry, a specific implementation of S12 in this case is:

determining, by the NFCC, whether an NFCEE ID in a first preset field in a route entry is an HCI-NFCEE;

if yes, determining, by the NFCC, whether a second preset field in the route entry indicates that a communication channel that is between the HCI-NFCEE and the NFCC and that corresponds to the first NFC communications technology is in an active state; and if yes, determining, by the NFCC, whether an NFC protocol type in the route entry is a first NFC protocol type; and if yes, determining, by the NFCC, that the route entry is the target route entry, where the first protocol type is a protocol type activated by the NFCC.

Further, the main processor receives a communication status update message sent by the NFCC to the main processor after the NFCC detects that an NFC communications technology type between the NFCC and at least one NFCEE changes; the main processor reconfigures the route table based on the communication status update message; and the main processor sends the reconfigured route table to the NFCC.

In the foregoing embodiment, the communication status update message includes: an identifier ID of an NFCEE having a changed NFC communications technology type between the NFCEE and the NFCC, and an invalid NFC communications technology type between the NFCEE and the NFCC.

That the main processor reconfigures the route table based on the communication status update message includes: determining, by the main processor based on the ID of the NFCEE having the changed NFC communications technology type between the NFCEE and the NFCC, whether the NFCEE having the changed NFC communications technology type is a host control interface HCI-NFCEE; if yes, determining, by the main processor, whether the invalid NFC communications technology type between the HCI-NFCEE and the NFCC is all NFC communications technology types limited by the HCI-NFCEE; and if yes, deleting, by the main processor, all route entries in the route table that are consistent with an ID value of the HCI-NFCEE.

In addition, if the main processor determines that the invalid NFC communications technology type between the HCI-NFCEE and the NFCC is some NFC communications technology types limited by the HCI-NFCEE, the main processor deletes an invalid NFC communications technology type in the route entries in the route table that are consistent with the ID value of the HCI-NFCEE.

The following describes a route configuration method for a contactless application according to an embodiment of the present invention in detail with reference to specific embodiments. The method includes:

1. Route Table Initialization/Configuration

Figure 9:
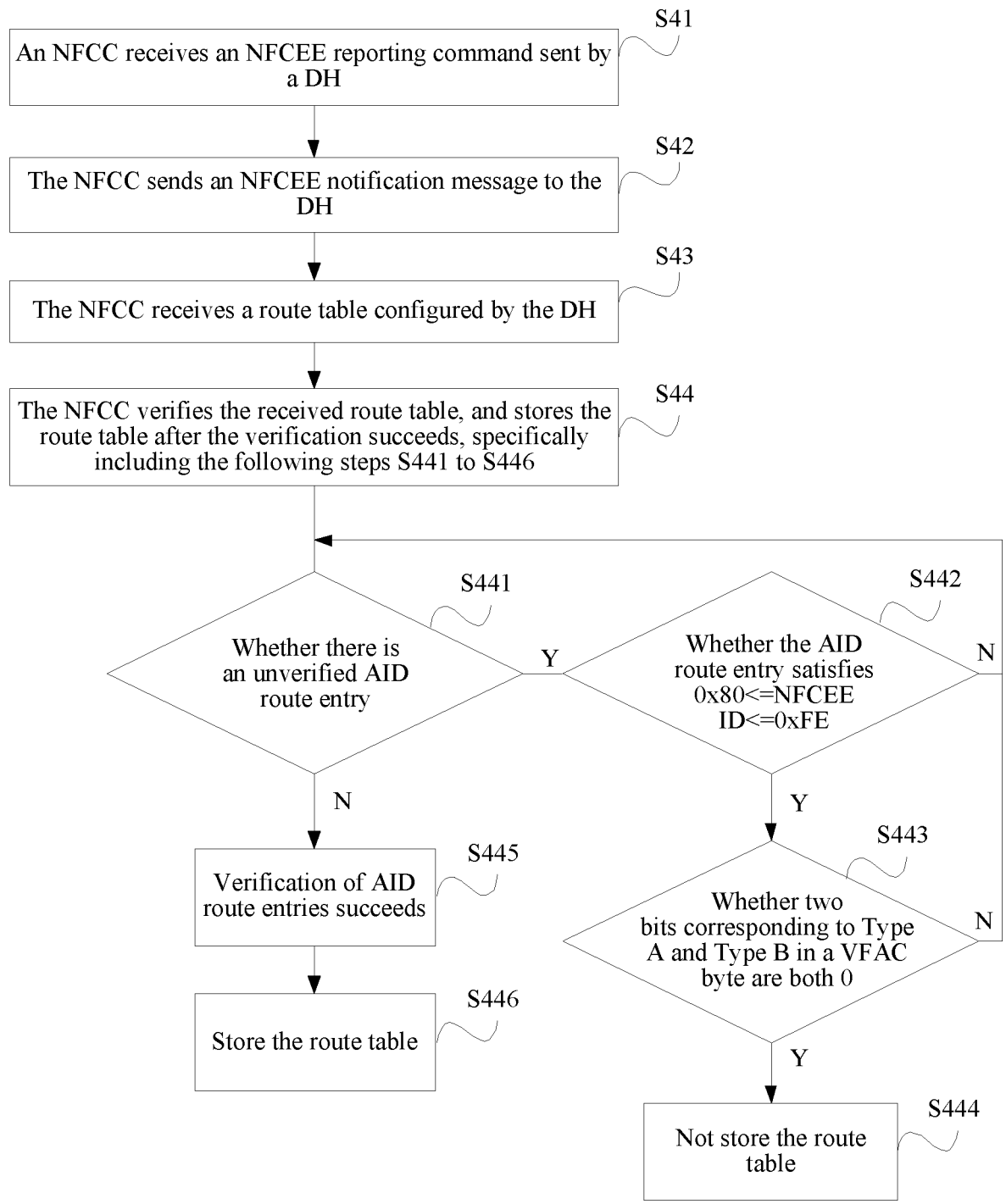
FIG. 9 is a flowchart of initialization and configuration of a route table in a contactless application according to an embodiment of the present invention.

FIG. 9 is a flowchart of initialization and configuration of a route table in a contactless application according to an embodiment of the present invention. As shown in FIG. 9, a route table configuration method in an NFCC includes the following steps.

Step S41: The NFCC receives an NFCEE reporting command (NFCEE Discover CMD) sent by a DH.

Step S42: The NFCC sends an NFCEE notification message (NFCEE_Discovery_NTF) to the DH.

After completing initialization and receiving the NFCEE reporting command sent by the DH, the NFCC reports, to the DH, the NFCEE notification message (NFCEE_Discovery_NTF) shown in Table 1.

TABLE 1

| NFCEE notification message NFCEE_DISCOVER_NTF | | |
|---|---|---|
| Payload fields (Payload Fields) | Length (Length) | Value/Description (Value/Description) |
| NFCEE ID | 1 byte | NFCEE identifier |
| NFCEE status (NFCEE Status) | 1 byte | 0x00 NFCEE available 0x01 NFCEE unavailable 0x02 to 0xFF RFU |
| Number of protocol information entries (Number of Protocol Information Entries) | 1 byte | It is a field supporting the NFCEE protocol. This value of the HCI-NFCE is 0. The HCI-NFCEE is a part of an HCI network, and therefore the HCI network is used in all communication. |
| NFCEE connection status (NFCEE Connection Status) | 1 byte | Refer to Table 2. |

As shown in Table 1, the notification message sent by the NFCC to the DH includes information such as an NFCEE ID and a connection status of an NFCEE and the NFCC.

When an NFCEE connected to the NFCC is an HCI-NFCEE, information that is about a connection status (NFCEE Connection Status) of the NFCEE and the NFCC and that is in the notification message sent by the NFCC to the DH includes indication information (for example, whether PIPE A/PIPE B is available) used for indicating a connection status of the NFCC and the HCI-NFCEE.

A method of determining, by the NFCC, whether an NFCEE is an HCI-NFCEE includes: determining, by the NFCC based on an ID of an NFCEE, whether the NFCEE is an HCI-NFCEE. Specifically, when 0x80<=NFCEE ID<=0xFE, the NFCEE is an HCI-NFCEE.

In Table 1, indication information used for indicating the connection status of the NFCC and the HCI-NFCEE is shown in Table 2. Values of b2, b1, and b0 are used for indicating an NFC communications technology type between the NFCC and the HCI-NFCEE.

TABLE 2

Table indicating the connection status of the NFCC and the HCI-NFCEE

| Bit mask (Bit Mask) | | | | | | | | Description (Description) |
|---|---|---|---|---|---|---|---|---|
| b7 | b6 | b5 | b4 | b3 | b2 | b1 | b0 | |
| 0 | 0 | 0 | 0 | 0 | | | | RFU |
| | | | | | X | | | 1 indicates being usable for a technology F. 0 indicates being unusable for the technology F. |
| | | | | | | X | | 1 indicates being usable for a technology B. 0 indicates being unusable for the technology B. |
| | | | | | | | X | 1 indicates being usable for a technology A. 0 indicates being unusable for the technology A. |

Step S43: The NFCC receives a route table configured by the DH.

The NFCC receives the route table configured by the DH by using an RF_SET_LISTEN_MODE_ROUTING_CMD instruction. The route table includes a plurality of route entries, and each route entry points to one target NFCEE.

This embodiment provides descriptions by using an AID route entry as an example.

TABLE 3

AID route entry

| Payload fields (Payload Fields) | Length (Length) | Value/Description (Value/Description) |
|---|---|---|
| Route (Route) | 1 byte | ID of an NFCEE that is pointed to |
| Power state (Power State) | 1 byte | Power state information |
| Access control (Access Control) | 1 byte | For access control information, refer to Table 2. |
| AID | 0 to 16 octets | Application identifier (Application Identifier) |

Table 3 shows a schematic structural diagram of an AID route entry. It can be learned from Table 3 that, each AID route entry configured by the main processor includes information such as the ID of the NFCEE to which the route entry points, the power state, the access control, and the AID.

Step S44: The NFCC verifies the received route table, and stores the received route table after the verification succeeds.

That the NFCC verifies the received route table includes the following steps.

Step S441: The NFCC determines whether the route table includes an unverified AID route entry, and if yes, performs step S442; or if not, performs step S445.

Step S442: The NFCC determines whether the current unverified AID route entry satisfies 0x80<=NFCEE ID<=0x FE, if the current unverified AID route entry satisfies 0x80<=NFCEE ID<=0xFE, performs step S443; or if the current unverified AID route entry does not satisfy 0x80<=NFCEE ID<=0xFE, goes back to step S441.

In this step, if the NFCEE ID in the AID route entry satisfies 0x80<=NFCEE ID<=0xFE, it indicates that a target NFCEE of the route entry is an HCI-NFCEE.

Step S443: The NFCC determines whether two bits corresponding to Type A and Type B in a VFAC byte of the current AID route entry are both 0, and if yes, determines that verification on the AID route entry fails; or if not, goes back to step S441, to determine that the verification on the current AID route entry succeeds.

For an AID route entry, if a target NFCEE of the AID route entry is an HCI-NFCEE, bits indicating Type A and Type B connection statuses in a Value Field for Access Control byte of the AID route entry cannot be both 0.

Step S444: The NFCC determines not to store the route table, and sends a receiving and verification failure message to the DH.

Step S445: The NFCC determines that verification on all AID route entries in the route table succeeds, and performs step S446.

Step S446: The NFCC stores the route table, and sends a receiving success message to the DH.

2. Route Processing Part

Figure 10:
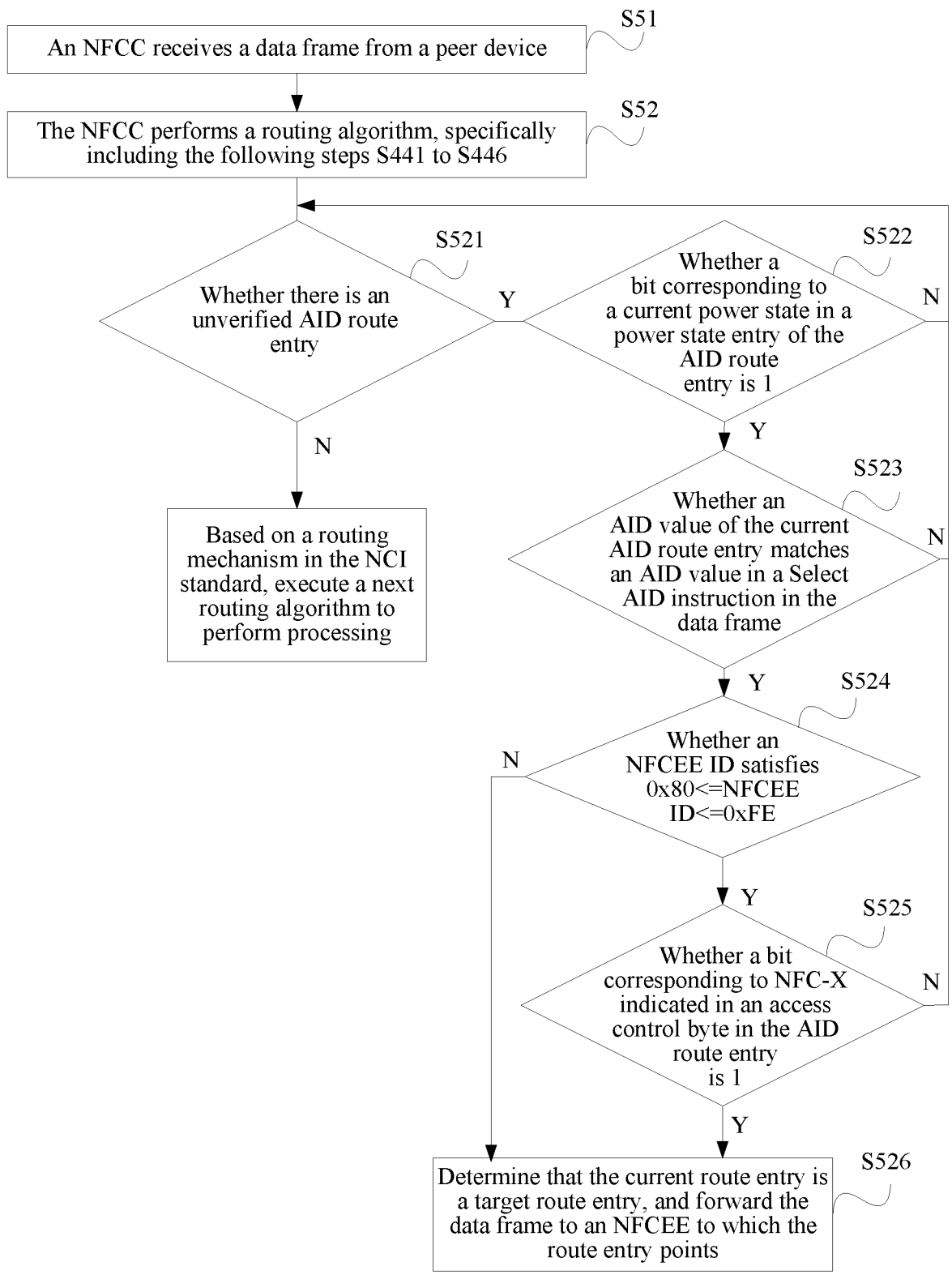
FIG. 10 is a flowchart of a route processing method according to an embodiment of the present invention.

FIG. 10 is a flowchart of a route processing method according to an embodiment of the present invention. As shown in FIG. 10, the route processing method in an NFCC includes the following steps.

Step S51: The NFCC receives a data frame from a peer device.

The NFCC establishes an underlying channel that is based on an NFC-X (X is one of A, B, F, and V) technology to the peer device, and receives the data frame from the peer device by using the NFC-X communications technology.

Step S52: The NFCC performs a routing algorithm. In this embodiment of the present invention, the routing algorithm performed by the NFCC is described by using an AID route entry as an example.

That the NFCC performs an AID routing algorithm includes the following steps.

Step S521: Determine whether there is an unverified AID route entry in a route table, and if yes, perform step S522.

Step S522: Determine whether a bit corresponding to a current power state in a power state (Power State) entry of the current unverified AID route entry is 1, and if yes, perform step S523; otherwise, go back to step S521.

Step S523: Determine whether an AID value of the current AID route entry matches an AID value in a Select AID instruction carried in the data frame, and if the two AID values match, perform step S524; otherwise, go back to step S521.

The AID value in the Select AID instruction carried in the data frame corresponds to a first AID, and the AID value of the AID route entry corresponds to a second AID. A method for performing matching between the first AID and the second AID is described in the foregoing embodiment, and details are not described again.

Step S524: Determine whether an ID of an NFCEE to which the current AID route entry points satisfies 0x80<=NFCEE ID<=0xFE, and if the ID satisfies 0x80<=NFCEE ID<=0xFE, determine that the NFCEE to which the route entry points is an HCI-NFCEE, and perform step S525; otherwise, perform step S526.

Step S525: Determine whether a bit corresponding to NFC-X indicated in an access control (Access Control) byte in the current AID route entry is 1, and if yes, perform step S526.

If an NFCEE value of a technical route entry of an AID is an HCI-NFCEE ID, a bit corresponding to Type X (X=A or B) in the access control (Access Control) byte needs to be 1.

Step S526: Determine that the current route entry is a target route entry, and forward the data frame to the NFCEE to which the route entry points.

It should be noted that, for ease of description, the foregoing method embodiments are described as a series of action combinations. However, persons skilled in the art should understand that the present invention is not limited to the described sequence of the actions, because some steps may be performed in another sequence or performed at the same time according to the present invention. In addition, persons skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

3. Route Update Part

Figure 11:
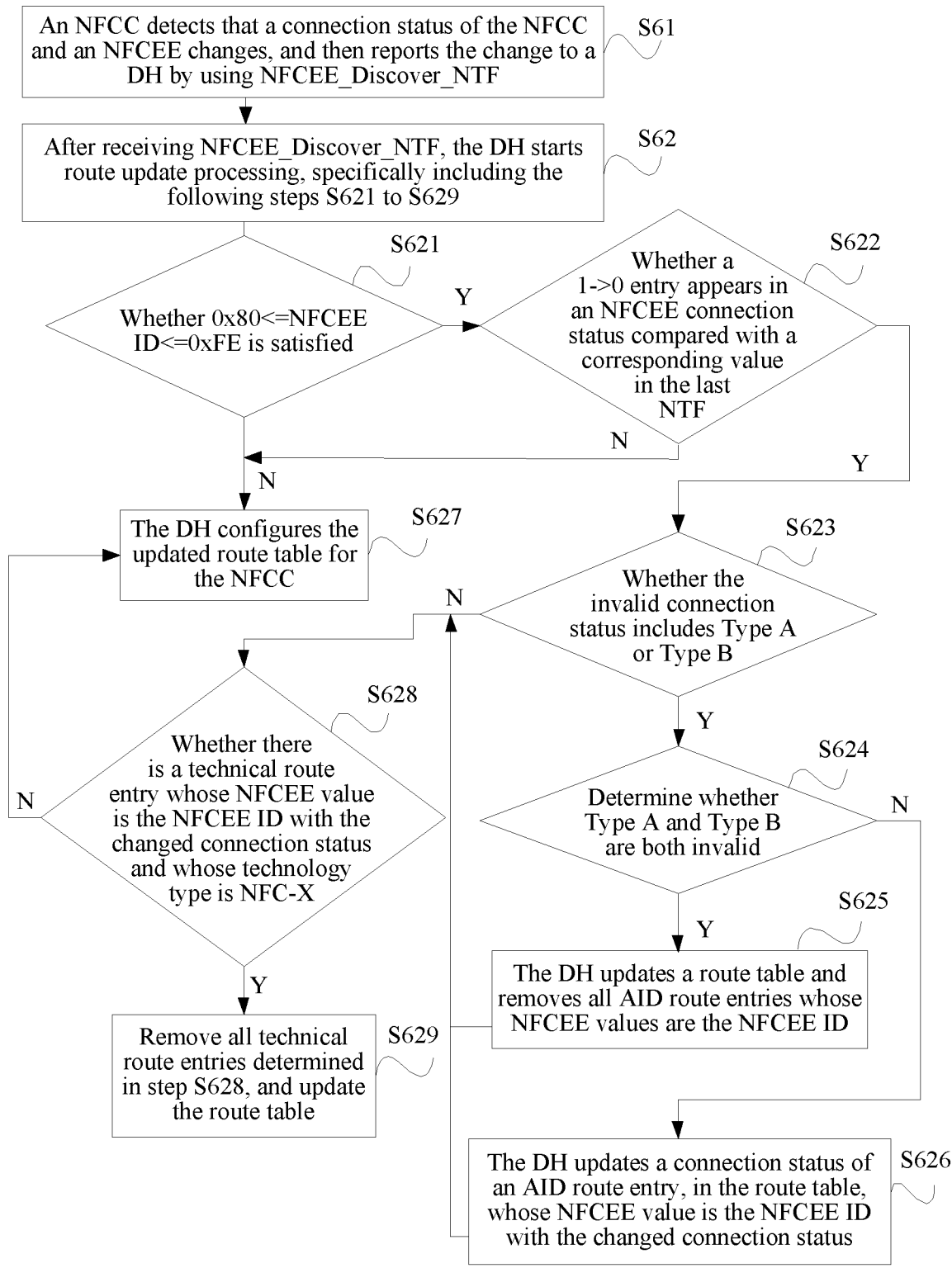
FIG. 11 is a flowchart of a route update method according to an embodiment of the present invention.

FIG. 11 is a flowchart of a route update method according to an embodiment of the present invention. As shown in FIG. 11, the route update method includes the following steps.

Step S61: An NFCC detects that a connection status of the NFCC and an NFCEE changes, and then reports the change to a DH by using NFCEE_Discover_NTF.

Step S62: After receiving NFCEE_Discover_NTF, the DH starts route update processing.

A specific method for the route update processing includes the following steps.

Step S621: The DH determines whether the NFCEE whose connection status changes is an HCI-NFCEE, that is, whether 0×80<=NFCEE ID<=0×FE is satisfied, and if yes, performs S622; or if not, performs step S627.

Step S622: The DH determines whether an invalid connection status occurs in a connection status NFC-X of the NFCEE whose connection status changes and the NFCC, that is, determines whether a 1->0 entry appears in an NFCEE connection status (NFCEE Connection Status) compared with a corresponding value in the last NTF, and if the 1->0 entry appears, determines that a route table needs to be updated, that is, performs step S623; or if not, performs step S627.

Step S623: The DH determines whether the invalid connection status includes Type A or Type B, and if the invalid connection status includes Type A or Type B, performs step S624; otherwise, performs step S628.

Step S624: The DH determines whether Type A and Type B connection statuses of the NFCEE whose connection status changes are both invalid, and if the Type A and Type B connection statuses are both invalid, performs step S625; otherwise, performs step S626.

Step S625: The DH updates the route table and removes all AID route entries whose NFCEE values are the NFCEE ID, and then performs S628.

Step S626: The DH updates a connection status of an AID route entry, in the route table, whose NFCEE value is the NFCEE ID with the changed connection status, and then performs S628.

Step S627: The DH configures the updated route table for the NFCC.

Step S628: The DH determines whether there is a technical route entry whose NFCEE value is the NFCEE ID with the changed connection status and whose technology type is NFC-X, and if there is the technical route entry, performs S629; otherwise, performs S627.

Step S629: The DH removes all technical route entries determined in step S628, and updates the route table.

Figure 12:
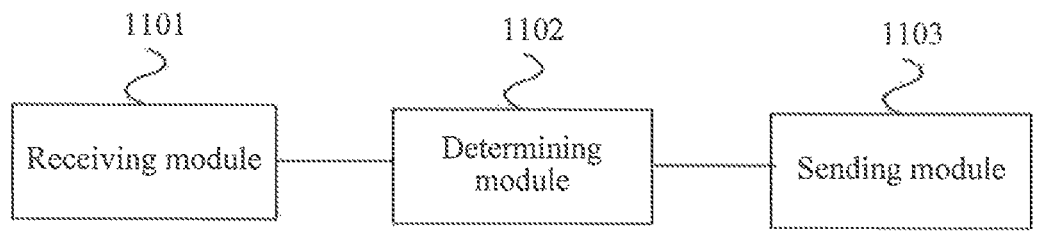
FIG. 12 is a schematic structural diagram of a route configuration apparatus for a contactless application according to Embodiment 1 of the present invention.

FIG. 12 is a schematic structural diagram of a route configuration apparatus for a contactless application according to Embodiment 1 of the present invention. The route configuration apparatus is applied to a near field communication NFC terminal. The NFC terminal includes a near field communication controller NFCC and a plurality of near field communication execution environments NFCEEs. The NFC terminal further includes a route table. The route table includes at least one route entry. The configuration apparatus is disposed in the near field communication controller NFCC. As shown in FIG. 12, the apparatus includes:

a receiving module 1101, configured to receive a data frame from a peer device by using a first NFC communications technology;

a determining module 1102, configured to determine a target NFCEE in a target route entry, where a plurality of communication channels exist between the target NFCEE and the NFCC, where the plurality of communication channels include a first communication channel corresponding to the first NFC communications technology, the target route entry is a route entry in the at least one route entry, the target route entry includes indication information, and the indication information indicates that the first communication channel is in an active state; and a sending module 1103, configured to send the data frame to the target NFCEE.

Further, the data frame includes a first AID value, the target route entry includes a second AID value, and the second AID value matches the first AID value.

Further, that the second AID value matches the first AID value includes one of the following:

the second AID value is the same as the first AID value;
the second AID value is a part of the first AID value; and
the first AID value is a part of the second AID value.

Further, an NFC protocol type in the target route entry is the same as an NFC protocol type activated by the NFCC.

Figure 13:
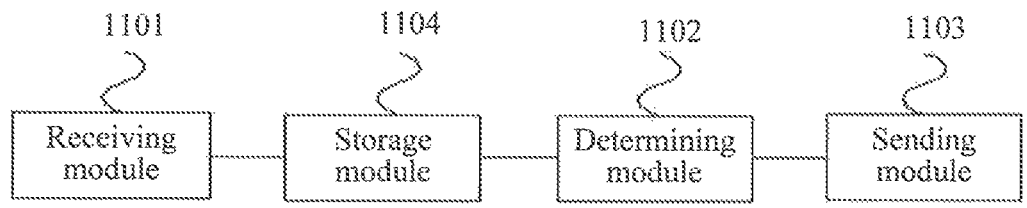
FIG. 13 is a schematic structural diagram of a route configuration apparatus for a contactless application according to Embodiment 2 of the present invention.

FIG. 13 is a schematic structural diagram of a route configuration apparatus for a contactless application according to Embodiment 2 of the present invention. As shown in FIG. 13, based on FIG. 12, the NFC terminal in which the NFCC is located further includes a main processor, and the apparatus further includes a storage module 1104, and before the determining module 1102 determines the target route entry in the at least one route entry in the route table, the receiving module 1101 is configured to receive an NFCEE reporting command sent by the main processor;

the sending module 1103 is configured to send, based on the NFCEE reporting command, an NFCEE discovery notification message corresponding to each NFCEE to the main processor, where if the NFCEE is an HCI-NFCEE, the NFCEE discovery notification message includes an active state of a communication channel when the HCI-NFCEE communicates with the NFCC by using different NFC communications technologies, so that the main processor configures a route entry between each of the NFCEEs and the NFCC, to obtain the route table;

the receiving module 1101 is further configured to receive the route table sent by the main processor; and the storage module 1104 stores the route table.

Further, the determining module 1102 is further configured to: when it is detected that an active state of a communication channel between the NFCC and at least one of the NFCEEs changes, send, by the determining module 1102, control information to the sending module 1103, where the control information is used for controlling the sending module 1103 to send a communication channel status update message to the main processor, so that the main processor reconfigures the route table based on the communication channel status update message; and the sending module 1103 sends the communication channel status update message to the main processor.

The apparatus in this embodiment may be configured to execute the technical solutions of the method embodiments shown in FIG. 7 to FIG. 11. Their implementation principles and technical effects are similar. Details are not described herein again.

Figure 14:
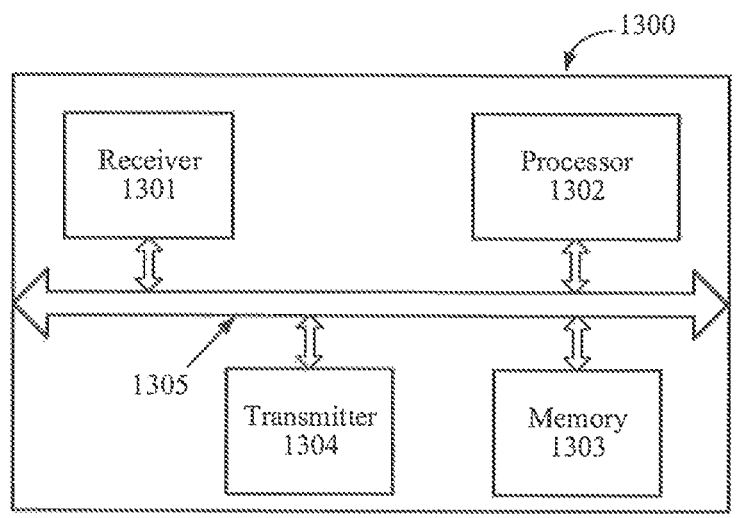
FIG. 14 is a schematic structural diagram of a route configuration apparatus for a contactless application according to Embodiment 3 of the present invention.

FIG. 14 is a schematic structural diagram of a route configuration apparatus for a contactless application according to Embodiment 3 of the present invention. The route configuration apparatus is applied to a near field communication NFC terminal. The NFC terminal includes a near field communication controller NFCC and a plurality of near field communication execution environments NFCEEs. The NFC terminal further includes a route table. The route table includes at least one route entry. The configuration apparatus is disposed in the near field communication controller NFCC. The apparatus includes:

The route configuration apparatus 1300 for a contactless application in this embodiment of the present invention includes a receiver 1301, a processor 1302, a memory 1303, and transmitter 1304. The receiver 1301, the processor 1302, the memory 1303, and the transmitter 1304 are connected to each other by using a bus 1305. The bus 1305 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only a bold line is used for representation in FIG. 14, but it does not represent that there is only one bus or one type of bus.

The memory 1303 may include a random access memory (random access memory, RAM for short), or may further include a non-volatile memory (non-volatile memory) such as at least one magnetic disk memory.

Specifically, the receiver 1301 is configured to receive a data frame from a peer device by using a first NFC communications technology;

the processor 1302 is configured to determine a target NFCEE in a target route entry, where a plurality of communication channels exist between the target NFCEE and the NFCC, where the plurality of communication channels include a first communication channel corresponding to the first NFC communications technology, the target route entry is a route entry in the at least one route entry, the target route entry includes indication information, and the indication information indicates that the first communication channel is in an active state; and the transmitter 1304 is configured to send the data frame to the target NFCEE.

Further, the data frame includes a first AID value, the target route entry includes a second AID value, and the second AID value matches the first AID value.

Further, that the second AID value matches the first AID value includes one of the following:
the second AID value is the same as the first AID value;
the second AID value is a part of the first AID value; and
the first AID value is a part of the second AID value.

Further, an NFC protocol type in the target route entry is the same as an NFC protocol type activated by the NFCC.

Further, the NFC terminal in which the NFCC is located further includes a main processor 1302, and the apparatus further includes the memory 1303, and before the processor 1302 determines the target route entry in the at least one route entry in the route table, the receiver 1301 is configured to receive an NFCEE reporting command sent by the main processor 1302;

the transmitter 1304 is configured to send, based on the NFCEE reporting command, an NFCEE discovery notification message corresponding to each NFCEE to the main processor 1302, where if the NFCEE is an HCI-NFCEE, the NFCEE discovery notification message includes an active state of a communication channel when the HCI-NFCEE communicates with the NFCC by using different NFC communications technologies, so that the main processor 1302 configures a route entry between each of the NFCEEs and the NFCC, to obtain the route table;

the receiver 1301 is further configured to receive the route table sent by the main processor 1302; and the memory 1303 stores the route table.

Further, the processor 1302 module is further configured to: when it is detected that an active state of a communication channel between the NFCC and at least one of the NFCEEs changes, send control information to the transmitter 1304, where the control information is used for controlling the transmitter 1304 to send a communication channel status update message to the main processor 1302, so that the main processor 1302 reconfigures the route table based on the communication channel status update message; and the transmitter 1304 sends the communication channel status update message to the main processor 1302.

The apparatus in this embodiment may be configured to execute the technical solutions of the method embodiments shown in FIG. 7 to FIG. 11. Their implementation principles and technical effects are similar. Details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A route configuration method for a contactless application, wherein the route configuration method is implemented by a near field communication (NFC) terminal comprising a main processor, an NFC controller (NFCC) coupled to the main processor wherein the NFCC comprises a memory storing a route table comprising a route entry, a plurality of NFC execution environments (NFCEEs) coupled to the NFCC, and wherein the method comprises:
receiving, by the NFCC, a data frame from a peer device using a first NFC communications technology;
receiving, by the NFCC, an NFCEE reporting command from the main processor;
sending, by the NFCC to the main processor based on the NFCEE reporting command, an NFCEE discovery notification message corresponding to each NFCEE, wherein when an NFCEE comprises a host controller interface NFCEE (HCI-NFCEE), the NFCEE discovery notification message comprises an active state of a communication channel, whereby the HCI-NFCEE communicates with the NFCC using different NFC communications technologies to cause the main processor to configure a route entry between each of the NFCEEs and the NFCC to obtain the route table;

receiving, by the NFCC, the route table from the main processor;

storing, by the NFCC, the route table;

determining, by the NFCC, a target NFCEE in a target route entry, wherein a plurality of communication channels are provided between the target NFCEE and the NFCC, wherein the communication channels comprise a first communication channel corresponding to the first NFC communications technology, wherein the target route entry comprises a route entry in route table, and wherein the target route entry comprises indication information indicating that the first communication channel is in an active state; and sending, by the NFCC, the data frame to the target NFCEE.

2. The route configuration method of claim 1, wherein the data frame comprises a first application identifier (AID) value, the target route entry comprises a second AID value, and the second AID value matches the first AID value.

3. The method of claim 2, wherein the second AID value comprises a part of the first AID value.

4. The method of claim 2, wherein the first AID value comprises a part of the second AID value.

5. The route configuration method of claim 2, wherein the second AID value is the same as the first AID value.

6. The route configuration method of claim 1, wherein an NFC protocol type in the target route entry is the same as an NFC protocol type activated by the NFCC.

7. The route configuration method of claim 1, further comprising:

detecting, by the NFCC, that an active state of a communication channel between the NFCC and at least one of the NFCEEs changes; and sending, by the NFCC, a communication channel status update message to the main processor to cause the main processor to reconfigure the route table based on the communication channel status update message.

8. A route configuration apparatus comprising:
a near field communication (NFC) terminal comprising:
a main processor;
an NFC controller (NFCC) coupled to the main processor and comprising a memory storing a route table comprising a route entry;
a plurality of NFC execution environments (NFCEEs) coupled to the main processor;
a receiver coupled to the main processor and configured to:
  receive a data frame from a peer device using a first NFC communications technology;
  receive an NFCEE reporting command from the main processor; and
  receive the route table from the main processor;
wherein the main processor is configured to determine a target NFCEE in a target route entry, wherein the target route entry comprises a route entry in the route table, and wherein the target route entry comprises indication information indicating that the first communication channel is in an active state;
a plurality of communication channels between the target NFCEE and the NFCC, the communication channels comprising a first communication channel corresponding to the first NFC communications technology; and
a transmitter coupled to the processor and configured to:
  send the data frame to the target NFCEE;
  send, based on the NFCEE reporting command, an NFCEE discovery notification message corresponding to each NFCEE to the main processor, wherein when an NFCEE is a host controller interface NFCEE (HCI-NFCEE), the NFCEE discovery notification message comprises an active state of a communication channel, whereby the HCI-NFCEE communicates with the NFCC using different NFC communications technologies to cause the main processor to configure a route entry between each of the NFCEEs and the NFCC to obtain the route table.

9. The apparatus of claim 8, wherein the data frame comprises a first application identifier (AID) value, wherein the target route entry comprises a second AID value, and wherein the second AID value matches the first AID value.

10. The apparatus of claim 9, wherein the second AID value comprises a part of the first AID value.

11. The apparatus of claim 9, wherein the first AID value comprises a part of the second AID value.

12. The apparatus of claim 9, wherein the second AID value is the same as the first AID value.

13. The apparatus of claim 8, wherein an NFC protocol type in the target route entry is the same as an NFC protocol type activated by the NFCC.

14. The apparatus of claim 8, wherein the processor is further configured to send control information to the transmitter when detecting that an active state of a communication channel between the NFCC and at least one of the NFCEEs changes, wherein the transmitter is further configured to send a communication channel status update message to the main processor, and wherein the control information controls the transmitter to send a communication channel status update message to the main processor causing the main processor to reconfigure the route table based on the communication channel status update message.

15. A computer program product comprising computer-executable instructions stored on a non-transitory computer-readable medium that, when executed by a processor, cause a near field communication (NFC) terminal to configure routing for a contactless application by:

receiving a data frame from a peer device using a first NFC communications technology;

sending, to the processor, based on an NFC execution environment (NFCEE) reporting command, an NFCEE discovery notification message corresponding to each NFCEE, wherein the NFC terminal comprises an NFC controller (NFCC), a processor, and a memory comprising a route table comprising a route entry, and wherein when an NFCEE comprises a host controller interface NFCEE (HCI-NFCEE), the NFCEE discovery notification message comprises an active state of a communication channel, whereby the HCI-NFCEE communicates with the NFCC using different NFC communications technologies to cause the processor to configure a route entry between each of the NFCEEs and the NFCC to obtain the route table;

storing the route table;

determining a target NFCEE in a target route entry, wherein a plurality of communication channels are provided between the target NFCEE and the NFCC, wherein the communication channels comprise a first communication channel corresponding to the first NFC communications technology, wherein the target route entry comprises a route entry in the route table, wherein the target route entry comprises indication information indicating that the first communication channel is in an active state; and sending the data frame to the target NFCEE.

16. The computer program product of claim 15, wherein the data frame comprises a first application identifier (AID) value, the target route entry comprises a second AID value, and the second AID value matches the first AID value.

17. The computer program product of claim 16, wherein the second AID value is the same as the first AID value.

18. The computer program product of claim 15, wherein an NFC protocol type in the target route entry is the same as an NFC protocol type activated by the NFCC.

19. The computer program product of claim 15, wherein the instructions further cause the terminal to:
  detect that an active state of a communication channel between the NFCC and at least one of the NFCEEs changes; and
  reconfigure the route table based on the state of a communication channel.

20. The computer program product of claim 15, wherein the second AID value comprises a part of the first AID value or the first AID value comprises a part of the second AID value.

* * * * *